United States Patent [19]

Brown

[11] Patent Number: 4,712,592
[45] Date of Patent: Dec. 15, 1987

[54] BICYCLE PUMP APPARATUS

[76] Inventor: Alexander N. Brown, 363 Kootenai Creek Rd., Stevensville, Mont. 59870

[21] Appl. No.: 928,373

[22] Filed: Nov. 10, 1986

[51] Int. Cl.[4] .............................................. B65B 3/04
[52] U.S. Cl. ...................................... 141/98; 280/201; 280/289 R; 417/313
[58] Field of Search ..................... 417/313; 152/415; 280/201, 289 R; 141/1–12, 98, 38; 297/118, 129, 463

[56] References Cited

U.S. PATENT DOCUMENTS 1,163,429  12/1915  Magin ............................ 280/289 R

FOREIGN PATENT DOCUMENTS 24723  10/1912  Norway ........................... 280/289 R
17886  of 1896  United Kingdom .
21514  of 1902  United Kingdom ................. 280/201

Primary Examiner—Houston S. Bell, Jr.
Attorney, Agent, or Firm—Arthur L. Urban

[57] ABSTRACT

Bicycle pump apparatus includes a cylinder portion, a piston portion, a handle portion, a seat mounting portion and an air discharge portion. The cylinder portion includes an elongated tubular section, the tubular section having an external diameter slidably engageable snugly with a seat post receiving section of a bicycle frame. The piston portion includes an elongated rod member having a length slightly longer than the tubular section. A transverse plunger member is affixed adjacent one end of the rod member, the plunger member having a diameter substantially equal to the internal diameter of the tubular section to provide a snug fit therebetween A transverse guide section is disposed adjacent an opposite end of the tubular section aligning and maintaining the rod member along the centerline thereof. The handle portion includes a grip member connected to an end of the rod member that extends outwardly beyond the guide section, the grip member having an exterior diameter not more than that of the external diameter of the tubular section. The seat mounting portion includes a central section engageable with an end of the tubular section remote from the handle portion with a passage through the central section. The air discharge portion includes a length of flexible tubing, one end of which is attached to an end of the mounting portion passage remote from the cylinder portion and an opposite end with a fitting connectable to a tire valve.

12 Claims, 4 Drawing Figures

BICYCLE PUMP APPARATUS

This invention relates to a novel bicycle pump apparatus and more particularly relates to a new bicycle pump apparatus that functions in more than one way.

With the widespread acceptance of automobiles, adults stopped using bicycles for transportation and only very few even used them for recreation. Thus, bicycles were popular only for those too young to drive automobiles.

More recently with the new emphasis on physical fitness, many adults started to use bicycles again for exercising. Some individuals even use their bikes for transportation to and from work and shopping. This trend has become greater with the drastic increases in the cost of motor fuel. It is common nowadays for bike riders to travel long distances, both on roadways and cross country, which increases the risk of breakdown of the equipment far from repair shops and service stations.

To overcome problems that could result from breakdowns, many bikers carry tools, tire repair kits and pumps. The tools usually are carried in a pouch attached to the rear of the bike seat.

Tire pumps with long cylinders are clamped to a frame section of the bike. Although carrying a tire pump in this way may be satisfactory initially if a rider exercises a high degree of care, over a period of time, the pump may shake free and be lost or damaged by falling under the rear wheel. Also, the pump may be damaged in a spill.

The exposed mounting can cause the pump to become encrusted with dirt and increase the possibility that it will not function when needed. A further problem is the risk that the pump will be laid on the ground for use and be forgotten. Should the tire pump become damaged or lost, it will not be available to repair a tire and this can be very serious when a rider is a long distance from home or a repair station.

From the above discussion, it is clear that conventional bicycle tire pumps are not satisfactory in many circumstances that commonly are encountered by a bike rider. Thus, there is a need for a new bicycle pump apparatus that eliminates the shortcomings of previous devices.

The present invention provides a novel bicycle pump apparatus which not only overcomes the deficiencies of earlier pumps, but also provides features and advantages not found in such pumps. The bicycle pump apparatus of the invention serves both as a pump and as the seat post of a bicycle. Thus, the pump apparatus is readily available to the rider without having an extra piece of equipment that adds weight and is susceptible to damage or loss. The pump apparatus cannot be left behind accidentally since the rider has to replace it to have a seat. Also, the pump is stored in a protected location free of contamination.

The pump apparatus of the present invention is simple in design and can be produced relatively inexpensively. Commercially available materials and components can be used in its fabrication. Conventional hand pump manufacturing techniques and procedures can be utilized by semi-skilled labor to produce it.

Since the pump cylinder also serves as the seat post, it has a high level of strength which makes the pump more durable with a long useful life. Little, if any, maintenance is required to keep the apparatus in good working condition.

The bicycle pump apparatus of the invention can replace a conventional bicycle seat post simply and conveniently. The apparatus can be modified easily to fit different makes of bicycles.

The pump apparatus can be removed from the seat post socket quickly and used conveniently with a minimum of instruction even by persons with limited mechanical aptitude or experience. The pump apparatus can be replaced in the frame socket just as easily for safe and protected storage until needed again. The apparatus cannot be shaken off the bicycle, damaged in a spill, contaminated with dirt or left behind inadvertently as may happen with conventional tire pumps.

These and other benefits and advantages of the novel bicycle pump apparatus of the present invention will be apparent from the following description and the accompanying drawings in which.

Figure 1:
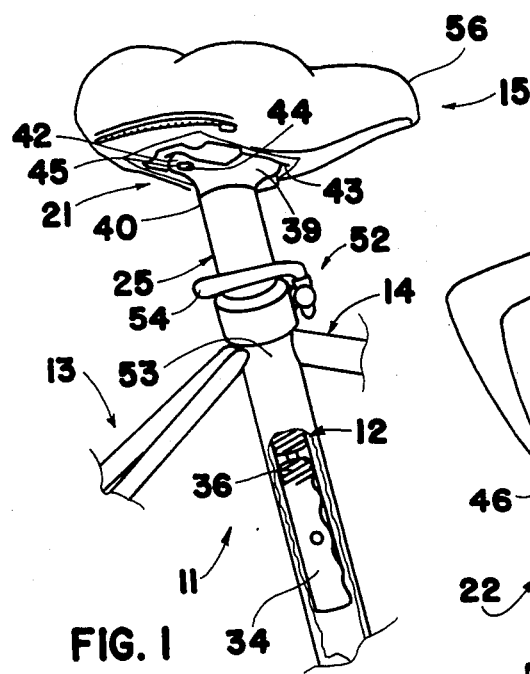
FIG. 1 is a view in perspective of one form of bicycle pump apparatus of the invention mounted on a bicycle.
Figure 2:
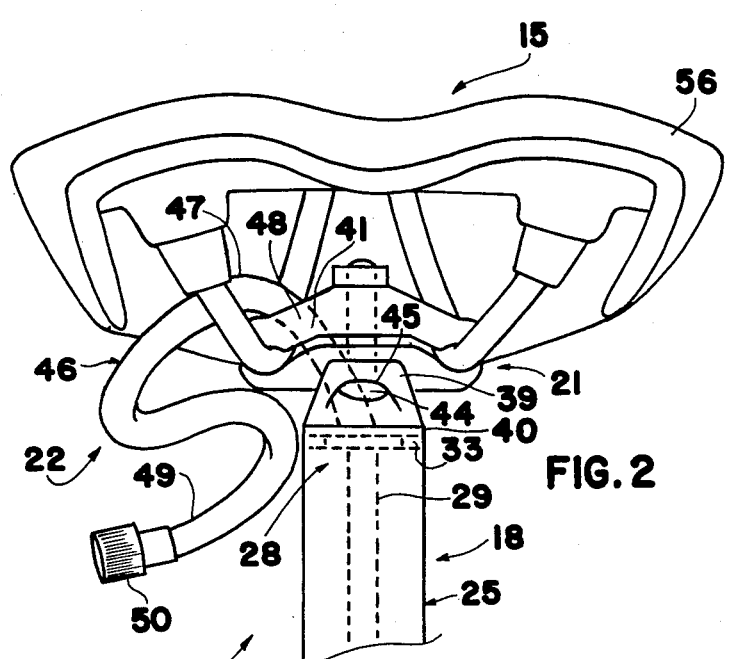
FIG. 2 is an enlarged view from the rear of the bicycle pump apparatus shown in FIG. 1.
Figure 3:
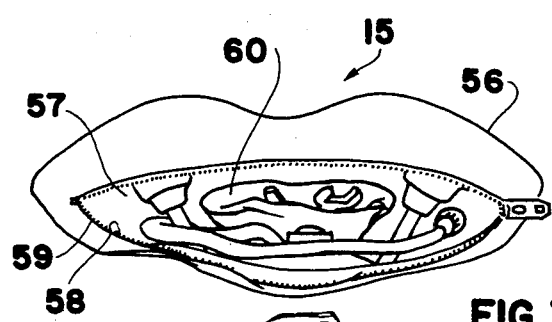
FIG. 3 is a view from the rear of the bicycle pump apparatus of FIG. 2 showing the seat cavity and its contents.

As shown in the drawings, one form of bicycle pump apparatus of the present invention is mounted in a seat post socket section 12 of a bicycle 13. The bicycle has a frame 14 and a seat 15. The bicycle pump apparatus 11 of the invention includes a cylinder portion 18, a piston portion 19, a handle portion 20, a seat mounting portion 21 and an air discharge portion 22.

The cylinder portion 18 of the pump apparatus 11 of the invention includes an elongated tubular section 25. The tubular section 25 has an external diameter slideably engageable snugly with a seat post receiving section 12 of a bicycle frame 14.

The piston portion 19 of the bicycle pump apparatus 11 of the invention includes an elongated rod member 27. The rod member 27 is disposed within the tubular section 25 along a centerline thereof. The rod member has a length slightly longer than the tubular section.

A transverse plunger member 28 is affixed adjacent one end 29 of the rod member 27. The plunger member 28 has a diameter substantially equal to the internal diameter of the tubular section. This relationship provides a snug fit between the plunger and the tubular section.

A transverse guide section 31 is disposed adjacent an opposite end 32 of the tubular section 25. The guide section 31 aligns and maintains the rod member along the centerline of the tubular section. The plunger member 28 advantageously includes a flexible peripheral section 33. The rod guide section 31 preferably is affixed within the tubular section 27.

The handle portion 20 of the bicycle pump apparatus 11 of the invention 18 includes a grip member 34. The grip member 34 is connected to an end 35 of the rod member 27 that extends beyond the guide section 31. The grip member 34 has an exterior diameter not more than the external diameter of the tubular section 27.

Advantageously, grip member 34 of the handle portion is pivotally connected to the end 35 of the rod member. Preferably, the grip member 34 is a molded plastic piece. It is desirable that the grip member include means such as threads 36 for selectively holding the grip adjacent to the adjoining end of the tubular section when the tubular section is disposed with the seat post socket.

The seat mounting portion 21 of the bicycle pump apparatus 11 of the present invention includes a central section 39. The central section 39 is engageable with an end 40 of the tubular section 25 that is remote from the handle portion 20. A passage 41 extends through the central section 39. Flange sections 42 and 43 extend from the central section. The flange sections 42 and 43 are connectable with an underside of a bicycle seat 15 with fastening means 44 extending through openings 45 in the flange sections.

The air discharge portion 22 of the pump apparatus 11 includes a length of flexible tubing 46. One end 47 of the tubing 46 is attached to an end 48 of the mounting portion passage 41 that is remote from the cylinder portion 18. An opposite end 49 of the tubing 46 includes a fitting 50 connectable with a tire valve 51.

The bicycle pump apparatus 11 of the invention advantageously includes quick release means 52 to fix the position of the cylinder portion 18 within the seat post receiving socket section 12. The release means 52 advantageously is mounted adjacent an upper end 53 of socket section 12 and preferably affixed thereto. The quick release means advantageously includes a pivotable handle 54 that tightens the socket section around the cylinder portion by a simple turn of the handle.

The pump apparatus 11 also preferably includes a seat portion 15 as a part thereof. The seat portion 15 has a cover member 56 that encloses a cavity 57. The cover member 56 includes a closeable opening 58 along the periphery thereof. The opening 58 communicates with the cavity 57. The closeable opening 58 advantageously includes a zipper fastener 59. The air discharge tubing 46 preferably is coiled within the seat cavity 57 and enclosed by the cover member 56. A tool kit 60 advantageously also may be disposed within the seat cavity 57.

The bicycle pump apparatus 11 of the present invention may be fabricated from a wide variety of different materials. Examples of suitable materials include metals, plastics, combinations thereof and the like. The cylinder and seat mounting portions as well as the rod member ordinarily are formed of metals or structural plastics. The air discharge tubing may be rubber or a flexible plastic. The plunger may be formed of a flexible natural or man-made material such as leather, rubber, plastic or the like.

The assembly of the pump apparatus 11 of the present invention is accomplished by attaching the seat mounting portion 21 to end 40 of the cylinder portion 18. The plunger member 28 is secured on end 29 of the rod member 27 and the plunger inserted into the cylinder portion.

Guide section 31 is slipped over the free end 35 of the rod member and slid therealong into contact with end 32 of the tubular section 25 of the cylinder portion and affixed thereto. Handle portion 20 is connected to the end 35 of the rod member that extends beyond the guide section 31.

Seat portion 15 is attached to the seat mounting portion 21 through suitable fasteners such as screws 63. End 47 of air discharge tubing 46 is attached to an end 48 of the mounting portion passage 41. The tubing then is coiled within the seat cavity 57 and the zipper 59 closed.

To mount the pump apparatus 11 of the invention on bike 13, the cylinder portion 18 is inserted in seat post socket section 12 of the bike while the release means 52 is open. When the seat is at the desired height, the release handle 54 is pivoted to tighten the pump apparatus to the frame. The rider then pedals the bicycle sitting on the seat 15 in the same manner as a conventional bike.

Figure 4:
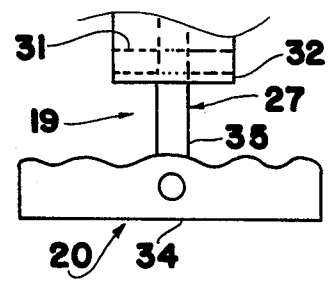
FIG. 4 is a view in perspective of the bicycle pump apparatus of the invention in use inflating a tire.
Figure 4:
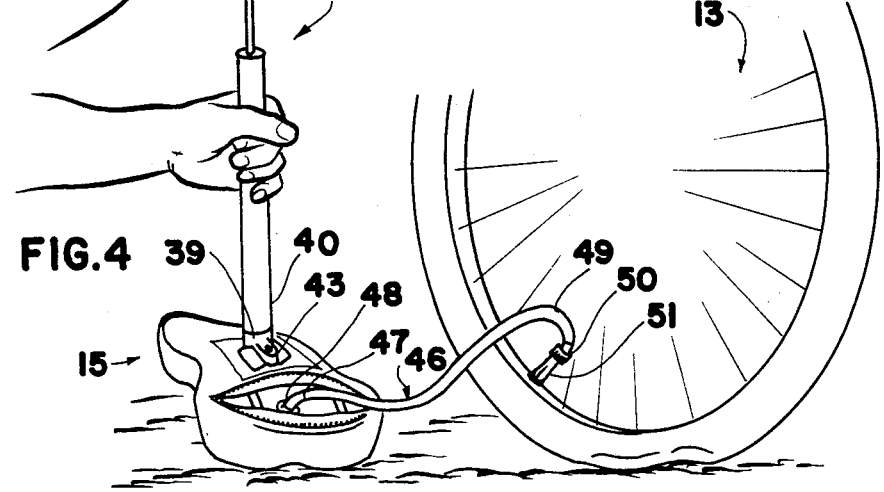

Should a bike tire be punctured, the puncture can be repaired with a patching kit (not shown) that may be stored within the seat cavity 57. To inflate the tire after it has been repaired, the release means 52 on the seat post socket 12 is loosened. The pump apparatus 11 is separated from the bicycle 13 by removing cylinder portion 18 from socket section 12. The zipper 59 is opened and the air discharge tubing 46 withdrawn from seat cavity 57. The pump apparatus is inverted and positioned as shown in FIG. 4. The fitting 50 at the end of tubing 46 is attached to the tire valve 51. Handle grip 34 is pivoted transversely of the rod member 27 and the pump apparatus is ready for use.

To use the pump apparatus 11, an individual grasps the cylinder portion 18 with one hand and the handle grip 34 with the other as shown. The handle grip is moved up and down causing the rod member 27 to which it is attached to do the same. Since plunger member 28 is affixed to the opposite end of the rod member, the movement of the rod member and handle causes the plunger to reciprocate within the tubular section 25 of the cylinder portion forcing air along tubing 46 and into the tire to inflate it.

When the desired tire pressure is attained, the fitting 50 on the end of the tubing is removed from the valve and the tubing coiled within the seat cavity 57 and the zipper closed. The cylinder portion of the pump apparatus 11 then is repositioned within the seat post socket 12 and tightened. The bicycle can be ridden in the normal manner until it is necessary to use the pump apparatus 11 again at which time the above sequence of steps is repeated.

The above description and the accompanying drawings show that the present invention provides a novel bicycle pump apparatus with features and advantages not found in earlier pumps. The pump apparatus of the invention serves both as a pump and as a seat post of a bicycle. In this way, the pump apparatus is always available for use when needed without having to carry an extra piece of equipment that adds weight and is susceptible to damage or loss.

The pump apparatus cannot be left behind inadvertently since the rider must replace it to have a seat. Also, the pump apparatus is stored in a protected location that is free of contamination and exposure to the elements. The apparatus cannot be shaken off a bike or damaged in a spill as may happen with conventional tire pumps mounted on the outside of the bicycle frame.

The pump apparatus of the invention is simple in design and can be produced relatively inexpensively from commercially available materials and components using conventional manufacturing techniques. The apparatus is durable in construction and has a long useful life with a minimum of maintenance.

A conventional bike seat post can be replaced with the pump apparatus of the invention conveniently. The pump apparatus can be used efficiently by persons with limited mechanical aptitude and experience. The apparatus can be modified to fit different makes of bicycles.

It will be apparent that various modifications can be made in the particular bicycle pump apparatus described in detail above and shown in the drawings within the scope of the present invention. The size, configuration and arrangement of components can be different to meet specific requirements. For example, the handle portion may be another shape such as a sleeve, a knob or the like. Check valves, special fittings and other accessories may be included. Also, pressurized gas cylinders can be utilized with the pump apparatus if desired.

These and other changes can be made in the pump apparatus of the invention provided the functioning and operation thereof are not adversely affected. Therefore, the scope of the present invention is to be limited only by the following claims.

What is claimed is:

1. Bicycle pump/seat post apparatus including a cylinder portion, a piston portion, a handle portion, a seat mounting portion and an air discharge portion; said cylinder portion including an elongated tubular seat post section, said tubular section having an external diameter slidably engageable snugly with a seat post receiving section of a bicycle frame; said piston portion including an elongated rod member disposed within said tubular section along a centerline thereof, said rod member having a length slightly longer than said tubular section, a transverse plunger member affixed adjacent one end of said rod member, said plunger member having a diameter substantially equal to the internal diameter of said tubular section to provide a snug fit therebetween, a transverse guide section disposed adjacent an opposite end of said tubular section aligning and maintaining said rod member along the centerline thereof; said handle portion including a grip member connected to an end of said rod member that extends outwardly beyond said guide section, said grip member having an exterior diameter not more than that of the external diameter of said tubular section; said seat mounting portion including a central section engageable with an end of said tubular section remote from said handle portion, a passage through said central section, flange sections extending from said central section connectable with an underside of a bicycle seat; said air discharge portion including a length of flexible tubing, one end of said tubing being attached to an end of said mounting portion passage remote from said cylinder portion, an opposite end of said tubing including a fitting connectable to a tire valve; whereby said pump/seat post apparatus can be secured within said seat post receiving section of a bicycle frame and a seat affixed to said seat mounting portion with said tubing within said seat, and said pump apparatus can be used to inflate a tire by withdrawing same from said frame section and inverting it, positioning said apparatus adjacent said tire resting on said seat as a base, attaching said fitting to a tire valve and reciprocating said piston portion to force air along said tubing into said tire.

2. Bicycle pump apparatus according to claim 1 wherein said plunger member of said piston portion includes a flexible peripheral section.

3. Bicycle pump apparatus according to claim 1 wherein said guide section is affixed within said tubular section.

4. Bicycle pump apparatus according to claim 1 wherein said grip member of said handle portion is pivotally connected to an end of said rod member.

5. Bicycle pump apparatus according to claim 1 wherein said grip member is a molded plastic piece.

6. Bicycle pump apparatus according to claim 1 wherein said grip member includes means for selectively holding same adjacent to the adjoining end of said cylinder tubular section.

7. Bicycle pump apparatus according to claim 1 wherein said flange sections of said seat mounting portion include fastener openings therethrough.

8. Bicycle pump apparatus according to claim 1 including quick release means fixing the position of said cylinder portion within said seat post receiving socket section.

9. Bicycle pump apparatus according to claim 1 including a seat portion with a cover enclosing a cavity, said cover member having a closeable opening along the periphery thereof communicating with said cavity.

10. Bicycle pump apparatus according to claim 9 wherein said closeable opening includes a zipper fastener.

11. Bicycle pump apparatus according to claim 9 wherein said air discharge tubing is coiled within said seat cavity enclosed by said cover member.

12. Bicycle pump apparatus according to claim 9 including a tool kit disposed within said seat cavity.

* * * * *